United States Patent [19]

Bagshaw et al.

[11] 4,125,690
[45] Nov. 14, 1978

[54] BATTERY ELECTRODE STRUCTURE

[75] Inventors: Norman E. Bagshaw, Marple Bridge; John McWhinnie, Bolton, both of England

[73] Assignee: Chloride Group Limited, London, England

[21] Appl. No.: 774,030

[22] Filed: Mar. 3, 1977

[30] Foreign Application Priority Data

Mar. 5, 1976 [GB] United Kingdom ............... 9011/76
Dec. 16, 1976 [GB] United Kingdom ............. 52678/76

[51] Int. Cl.² .................... H01M 4/14; C22C 11/02
[52] U.S. Cl. .................................... 429/226; 75/167; 148/32.5; 429/245

[58] Field of Search ............... 75/167; 148/32, 32.5; 429/226, 245

[56] References Cited

U.S. PATENT DOCUMENTS 2,159,124   5/1939   Betterton et al. ............... 75/167
2,794,707   6/1957   Walsh ............................. 75/167

Primary Examiner—R. Dean
Attorney, Agent, or Firm—Oblon, Fisher, Spivak, McClelland & Maier

[57] ABSTRACT

There is disclosed a battery electrode structure made of a lead-calcium-tin alloy comprising 0.075 to 0.13% by weight calcium, 0.005 to 0.99% by weight tin and 0.0001% to 0.1% by weight aluminium, the balance being substantially lead.

5 Claims, 1 Drawing Figure

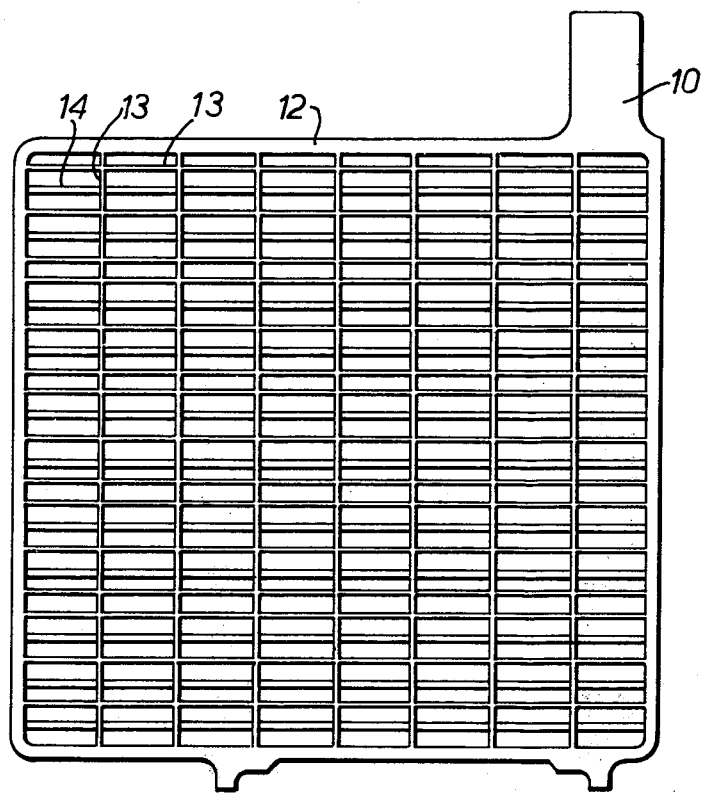

BATTERY ELECTRODE STRUCTURE

The present invention relates to lead alloys for use in electric storage batteries in particular for use in the production of cast grids or other support structures for the active material of the electrodes.

The specification of British Pat. No. 712,798 discloses lead calcium and lead tin calcium alloys containing aluminium as an antidrossing agent. The presence of aluminium reduced the oxidation rate of the bulk of the molten metal and minimizes the loss of alloying elements.

This earlier specification discloses an alloy containing 0.08% by weight calcium, 1.5% by weight tin, 0.05% by weight aluminium and 98.37% by weight lead. It also teaches that alloys having 0.03% to 0.1% calcium, 1% to 2% by weight tin, 0.01% to 0.1% aluminium, balance lead have superior properties.

The specification of British Pat. No. 1,338,823 teaches the use of a lead-calcium alloy containing 0.02 to 0.1% calcium, and 0.3 to 3.0% tin the ratio of tin to calcium being in the range 150:1 to 5:1.

We have found however that at calcium contents below 0.075% the material is insufficiently hard within acceptable periods of time to be mechanically trimmed and in addition the corrosion of the alloy is greater as the tin content increases above 1%.

We have found that greatly improved results are obtained if one works with alloys having a selected combination of calcium, tin and aluminium contents.

Thus according to the present invention a lead-calcium-tin alloy comprises 0.075% to 0.13% by weight calcium, preferably 0.08 to 0.10% and more preferably 0.08% to 0.09% calcium, 0.005% up to less than 1.0% by weight tin, preferably 0.005% to 0.99% by weight and more preferably 0.1% to 0.8% and especially 0.4 to 0.7% tin, aluminium in an amount of 0.001% to 0.1% the balance being lead, the alloy when cast having an initial Brinell hardness measured within 15 minutes of casting of at least 7.5 and desirably at least 10.

The invention also extends to a lead-calcium-tin alloy comprising 0.081% to 0.099% calcium and more preferably 0.085% to 0.09% calcium, 0.35% to 0.99% tin and more preferably 0.37% to 0.8% tin and especially 0.4% to 0.7% tin, aluminium in an amount effective in the production of the alloy to diminish oxide inclusions and preferably in an amount of 0.0001% to less than 0.1%, more preferably 0.0005% to less than 0.01% aluminium, and especially 0.003 to 0.009% the balance being lead, the alloy preferably containing at least 98.5% lead, the alloy when cast having an initial Brinell hardness measured within 15 minutes of casting of at least 10.

Alloys of this defined composition are very suitable for casting into the shape of current conducting grids for lead acid electric storage batteries.

The invention also extends to a finished shape cast product, e.g. a battery grid, or other cast structure or a thin sheet from which the grid will be produced by cool temperature mechanical shaping e.g. punching or slitting and expanding.

Thus the invention also extends to an apertured shaped product for example a battery electrode structure such as a cast grid comprising a lead-calcium-tin alloy comprising 0.075 to 0.13% preferably 0.081% to 0.099% by weight calcium, more preferably 0.085 to 0.099% and especially 0.085% to 0.09% calcium, 0.005 up to 0.99%, preferably 0.35% up to 0.99% by weight tin, more preferably 0.35% to 0.9% by weight and especially 0.37% to 0.8% and especially 0.4% to 0.7% tin, and aluminium in an amount up to less than 0.01% and preferably in an amount of 0.0001% to less than 0.01%, more preferably 0.003% to 0.009% aluminium.

Another preferred composition is 0.081% to 0.095% calcium, 0.005% to 0.01% aluminium, 0.35% to 0.9% tin, balance lead.

The invention may be put into practice in various ways and a number of specific embodiments will be described to illustrate the invention with reference to the following Examples.

Examples 1 and 2 are comparison examples.

EXAMPLES 1–6

The compositions for these examples are given in Table 1 below. Each alloy was made up by the addition of a solid lead, 2% calcium, 0.2% aluminium alloy to molten lead held at 375°–400° C. Tin was added as the pure solid metal to the molten alloy after it had been cooled to 350° C.

The alloy was cast on a water cooled grid casting machine having an enclosed delivery system of the type conventionally used for casting 6% antimony lead grids. The pot was held at 400° C. and the metal delivery pipe at 520° C. so that the metal is kept out of contact with air until it issues from the outlet orifices. The aluminium content of the pot was arranged always to be at least 0.01% by weight.

The mould face was spray coated with a thermal insulation layer of cork composition to a thickness of about 0.005 inches. Conventional automotive battery grids of the shape and size shown in FIG. 1 were cast satisfactorily and a convenient casting rate was 11 grids per minute. The thickness of the frame 12 was 1.85 mm for the positive and 1.68 mm for the negative and the cross sectional area of the lozenge 13 was 0.009 sq cms for the positive and 0.008 sq cms. for the negative, the cross sectional area of the wires 14, being 0.014 sq cm for the positive and 0.012 sq cms for the negative.

TABLE 1

| | Pot alloy composition | | % Grid analysis by weight | | |
| Example | Ca Content | Sn Content | Ca Content | Sn Content | Al Content |
| --- | --- | --- | --- | --- | --- |
| 1 | 0.08 | 0.4 | 0.06 | 0.4 | 0.003 |
| 2 | 0.08 | 0.7 | 0.06 | 0.7 | 0.003 |
| 3 | 0.095 | 0.4 | 0.075 | 0.4 | 0.003 |
| 4 | 0.095 | 0.7 | 0.075 | 0.7 | 0.003 |
| 5 | 0.11 | 0.4 | 0.09 | 0.4 | 0.006 |
| 6 | 0.11 | 0.7 | 0.09 | 0.7 | 0.006 |

The alloys given in Table 1 were cast at rates of between seven and 11 castings per minute using cooling water at 4 gallons per hour and at 7 gallons per hour, and with the inlet water temperature at 25° C. or at 15° C. Analysis of the tensile strength results indicated that the use of high rates of cooling and casting with the higher calcium level of 0.09% in the grid resulted in the strongest grids.

Table 2 shows the result of age hardening tests. These were carried out on the lug 10 of the grids (see FIG. 1) using a 1 mm diameter ball indentor with a 1 kg load applied to it. The higher the value in Table 2 the harder is the material; a value of at least 12 is desirable to enable the grid to be automatically trimmed and handled. It is thus desirable that a value of 12 should be achieved as soon as possible after casting.

TABLE 2

| Number of days since casting | | 0 | 1 | 2 | 5 | 10 | 25 | 100 |
|---|---|---|---|---|---|---|---|---|
| Ex. | Calcium content % | Tin content | | | | | | |
| 1 | 0.06 | 0.4 | 6.6 | 6.8 | 6.9 | 7.1 | 7.3 | 9.2 | 10.1 |
| 2 | 0.06 | 0.7 | 6.7 | 7.3 | 7.7 | 8.5 | 9.5 | 12.6 | 13.6 |
| 3 | 0.075 | 0.4 | 7.6 | 8.6 | 9.2 | 10.6 | 12.1 | 13.0 | 14.5 |
| 4 | 0.075 | 0.7 | 7.7 | 9.4 | 10.3 | 11.8 | 13.0 | 13.9 | 14.8 |
| 5 | 0.09 | 0.4 | 10.8 | 12.8 | 13.0 | 13.0 | 13.0 | 14.2 | 14.4 |
| 6 | 0.09 | 0.7 | 11.1 | 12.5 | 13.3 | 14.0 | 14.4 | 14.8 | 15.9 |

Table 3 shows the results of corrosion tests. These were carried out on complete battery grids which were cleaned, dried and weighed before assembly into test cells as the anode. Sheet lead cathodes were used with 1.250 specific gravity sulphuric acid as the electrolyte.

The test cells were connected in series and the grids were corroded at a constant current density of 0.84mA/sq cm of surface area exposed to the electrolyte at room temperature, 20° C., for 6 weeks. The current and electrolyte specific gravity were maintained at these levels regularly throughout the test.

The grids were then washed and immersed in a stripping solution to remove the corrosion products. The stripping solution was made up of 300 g. ammonium acetate, 200 g. hydrazine dihydrochloride, 10 ml. glacial acetic acid, and 2 liters of water.

The stripped grids were then washed, dried and weighed and the % weight loss calculated.

The samples were also examined microscopically. Sections of the grid were mounted and the surface ground and polished and then etched in citric acid/ammonium molybdate to show up the grain structure.

TABLE 3

| Example | Calcium Content | Tin Content | Mean Weight Loss | Range of Weight Loss |
|---|---|---|---|---|
| 1 | 0.06 | 0.4 | 3.43 | 3.23–3.73 |
| 2 | " | 0.7 | 3.17 | 2.96–3.44 |
| 3 | 0.075 | 0.4 | 3.44 | 3.29–3.61 |
| 4 | " | 0.7 | 3.33 | 3.08–3.45 |
| 5 | 0.09 | 0.4 | 3.83 | 3.71–3.97 |
| 6 | " | 0.7 | 3.82 | 3.40–4.11 |

The microscopic metallographic analysis revealed that as the calcium content increases the grain size is reduced whilst as the tin content increases the grain size tends to increase.

Careful analysis of tensile strength tests indicates that whilst the tensile strength values range between 260 and 525 kgs/sq cm the higher the calcium level and the more rapid the cooling of the cast grid the higher the strength tends to be. It is clear that with both the tin and the calcium being expensive ingredients, one will wish to keep their presence to the minimum value compatible with satisfactory grid properties.

Moreover at tin levels in the grid above 0.9% the resistance of the grids to corrosion as indicated both by the weight loss tests and by metallographic examination is reduced at the higher levels of calcium which it is desirable to use on the grounds of rapidity of age hardening and increased tensile strength.

A particularly preferred alloy composition comprises 0.085 to 0.099% by weight calcium, 0.401 to 0.499% by weight tin, the ratio of tin to calcium being less than 5 to 1, there being 0.001 to less than 0.01, e.g. 0.002 to 0.009% aluminium, the balance being substantially lead.

Specific examples of such preferred alloys are given in table 4 below.

Table 4

| Example | Calcium Content | Tin Content | Aluminium Content |
|---|---|---|---|
| 7 | 0.090 | 0.42 | 0.006 |
| 8 | 0.095 | 0.42 | 0.007 |
| 9 | 0.095 | 0.45 | 0.007 |
| 10 | 0.097 | 0.48 | 0.008 |

As mentioned above, the alloy of this invention can be converted into supports for the electrodes of lead acid cells either by casting in a mould defining a grid or by cold wrought procedures. When these latter procedures are to be used, the alloy may be continuously cast as a sheet and is then preferably immediately rolled to a sheet once it has solidified or it may be given additional cooling so that it is rolled at about ambient temperature. The rolling can conveniently be carried out continuously, e.g. on the output from a chilled roll continuous sheet casting machine. Thus the rolling may be carried out within less than 1 minute, e.g. less than 10 minutes and certainly less than 1 hour, from the moment the metal has solidified. This procedure has a desirable effect on the age hardening and strength properties of the alloy.

The sheet may be rolled so as to reduce its thickness by an amount of at least from an original thickness of 2 down to a rolled thickness of 1, i.e. a reduction ratio of at least 2, and preferably at least 4, e.g. in the range 2 to 20 or 4 to 10.

The rolled sheet can then be punched out to the desired shape or preferably slit in rows of short spaced apart slits and then pulled either lengthwise or preferably across the length of the strip continuously to form an expanded metal mesh, in this case the rows of slits being along the length of the strip. This expanded mesh is then used as the electrode support and may be pasted with active material in conventional manner.

What we claim as our invention and desire to secure by Letters Patent is:

1. A battery electrode structure made of a lead-calcium-tin alloy consisting essentially of 0.081 to 0.099% by weight calcium, 0.4 to 0.7% by weight tin and 0.0001% to 0.1% by weight aluminum, the balance being substantially lead, said alloy having a Brinell hardness of at least 12, 2 days after casting to enable the alloy to be automatically trimmed and handled.

2. A battery electrode structure of claim 1 containing 0.003 to 0.006% aluminium.

3. A battery electrode structure of claim 1 comprising 0.085 to 0.09% by weight calcium and 0.4 to 0.7% by weight tin and aluminum in an amount of 0.0001% up to less than 0.01% by weight, the balance being substantially lead.

4. A battery electrode structure of claim 3 containing 0.003 to 0.009% aluminium.

5. A battery electrode structure of claim 1 comprising 0.088% to 0.099% by weight calcium, 0.401 to 0.499% by weight tin, the ratio of tin to calcium being less than 5:1 and 0.001 to less than 0.01% aluminium, the balance being substantially lead.

* * * * *